Figure 1:
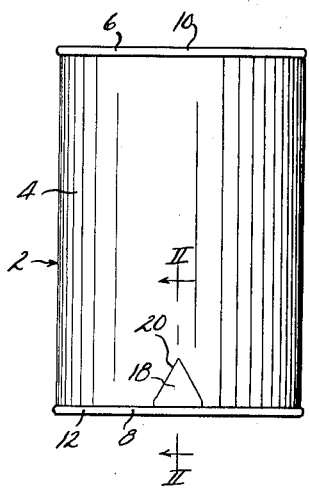

Oct. 30, 1956  J. S. MATHIAS  2,768,469
POISON BAIT DISPENSER AND METHOD OF MAKING SAME
Filed Sept. 12, 1955

INVENTOR.
John S. Mathias
BY
Hamilton & Hamilton
Attorneys.

United States Patent Office

2,768,469
Patented Oct. 30, 1956

2,768,469

POISON BAIT DISPENSER AND METHOD OF MAKING SAME

John S. Mathias, Kansas City, Mo., assignor to Rockwell Laboratories, Inc., Kansas City, Kans., a corporation of Missouri Application September 12, 1955, Serial No. 533,603

5 Claims. (Cl. 43—131)

This invention relates to new and useful improvements in poison bait dispensers, and has as its principal object the provision of a dispenser which is self-feeding; that is, which will dispense the poisoned food, which is in granular form, as it is used, maintaining a sufficient supply discharged therefrom to act effectively as a bait to attract the pests for which the poison is intended. The dispenser as described as intended for use primarily against rats and other rodents, but it will be apparent that its use is not limited in this respect.

Another object is the provision of a dispenser of the class described constituting a container having holes in the lower portion of the sides thereof, and in the bottom thereof, and having legs supporting the container above the floor, whereby poison bait may feed freely through said holes by gravity.

A further object is the provision of a method whereby a dispenser as above described may be produced easily and conveniently from a container of the "tin can" variety, which may serve also as the container in which the poison bait is shipped and sold.

Other objects are extreme simplicity and economy of construction, dependability and efficiency of operation, and adaptability for use in dispensing other powdered or granular materials.

Figure 2:
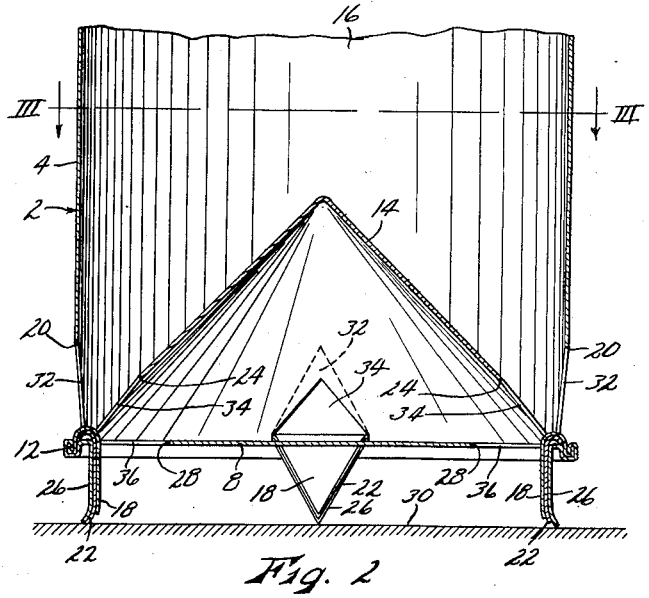
Figure 3:
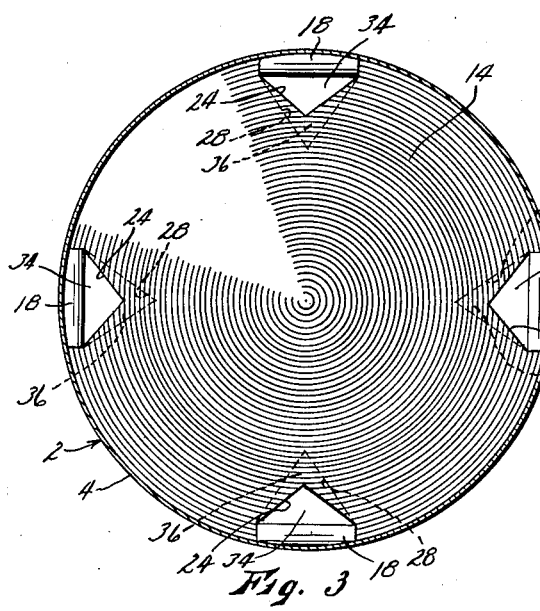
Figure 4:
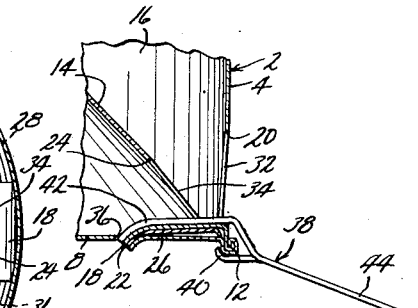

With these objects in view, as well as other objects which will appear in the course of the specification, reference will be had to the drawing, wherein:

Fig. 1 is a side elevational view of a poison bait dispenser embodying the present invention, prior to the formation of the outlet openings and supporting legs, Fig. 2 is an enlarged, fragmentary sectional view taken on line II—II of Fig. 1, showing the supporting legs and outlet openings completed, Fig. 3 is a sectional view taken on line III—III of Fig. 2, and Fig. 4 is a fragmentary view similar to Fig. 2, showing the method of cutting the outlet openings and utilizing the material removed therefrom as a supporting leg.

Like reference numerals apply to similar parts throughout the several views, and the numeral 2 applies generally to the dispenser, which may have the form of the ordinary circular sheet metal container commonly known as a "tin can," having a cylindrical side wall 4, and generally planar top and bottom end walls 6 and 8, the edges of which are rolled into engagement with the upper and lower edges respectively of side wall 4 to form sealing beads 10 and 12.

A conical insert 14 is placed loosely in the bottom of the dispenser, said insert having its apex extending upwardly and having a diameter approximately equal to the internal diameter of the dispenser. It is to be understood that said insert is placed in the dispenser before said dispenser is filled with poison bait, and that said poison bait occupies the space 16 above the insert. The poison bait holds the insert in its proper position by virtue of its weight. The insert may also be made of sheet metal, or could be formed more cheaply of paper, plastic, or other material.

Side wall 4 of the dispenser has a plurality of triangular tabs 18 defined thereon at the lower edge thereof, the base of each of said tabs being the bead 12, and the remaining two sides thereof being defined by cut or score lines 20 formed in side wall 4 and converging upwardly. Said tabs are spaced equally about the circumference of the dispenser. Matching sets of tabs 22 are defined in insert 14 by score lines 24, and another matching set of tabs 26 are formed in bottom wall 8 by score lines 28.

The dispenser is opened for use by pushing each tab 18 inwardly with any suitable tool until it engages and pushes out its corresponding tab 22 of insert 14, and then pushing both of tabs 18 and 22 against the corresponding tab 26 of bottom wall 8 to tear it free from said bottom wall. The three tabs, lying against each other, are then bent to project downwardly from bottom wall 8, thereby forming legs to support the bottom wall 8 above the floor 30 or other surface on which the dispenser may be placed.

The bending out of tabs 18, 22 and 26 from their respective walls 4, 14 and 8 forms holes 32, 34 and 36 respectively in said walls, through which the poison bait flows easily from the dispenser to rest on floor 30. Said bait is ordinarily a dry powdered or granular material, such as ground corn, treated with a poisonous substance, and will flow easily by gravity. The bait will flow out in small piles around each of the legs, the amount in each pile being dependent on the fluidity and angle of repose of the bait material. As the bait is consumed by the rats, more will flow from the dispenser to take its place.

The legs 18—22—26 provide that bait may flow freely through the bottom holes 26 by elevating the bottom above the floor. The holes 34 in insert 14 provide that the bait has direct access to bottom holes 36. Also, the fact that the side wall tabs 18 are threaded through the holes 34 of the insert provides that the insert will be held firmly in place. The primary purpose of the insert is to insure that virtually the entire contents of the dispenser will flow outwardly therefrom by gravity, leaving no wasted portion in the bottom of the container. The fact that each leg is three layers thick provides reinforcement so that said legs will have ample strength to support the dispenser.

It will be apparent that the tabs 18, 22 and 26 also may be formed without the use of score lines as shown, by utilizing an ordinary can opener 38 of the "beer can" type, as shown in Fig. 4. The claw 40 of the opener is hooked inside the bead 12 of the dispenser, with the pointed blade 42 extending upwardly along the side of the can. The handle 44 is then tiled outwardly and upwardly, the blade cutting successively through walls 4, 14 and 8 to form tabs 18, 22 and 26, and bending said tabs to the position shown in Fig. 2. Even though the score lines could be dispensed with under this method, it is nevertheless desirable that the tab spacing and frequency be indicated and defined on the side walls, as by printing on the label. This will insure that the legs will be spaced properly to provide good stability of the dispenser on its legs, and that there will be the correct number of holes to dispense the proper amount of poison bait at any one time.

While I have shown and described a specific embodiment of my invention, it will be apparent that many minor changes of structure, operation and method of making the dispenser could be made without departing from the spirit of the invention as defined by the scope of the appended claims.

What I claim as new and desire to protect by Letters Patent is:

1. A poison bait dispenser comprising a container having a generally planar bottom wall and vertical side walls, said container having tabs struck from the walls thereof adjacent its lower end, said tabs projecting below the level of said bottom wall to provide supporting legs for said dispenser.

2. A poison bait dispenser comprising a container having a generally planar bottom wall and vertical side walls, said container having tabs defined in the walls thereof adjacent the lower end thereof, whereby said tabs when struck out from said walls to form outlet openings may be extended below the level of said bottom wall to form supporting legs for said dispenser.

3. A dispenser as recited in claim 1 wherein each leg is formed by a tab cut from said side wall and a tab cut from said bottom wall, said tabs being bendably joined to said walls along substantially coextensive lines adjacent the juncture of said side and bottom walls, and said side wall tab extending downwardly through the bottom wall opening formed by the removal of said bottom tab, said tabs lying togther to form a reinforced leg.

4. A dispenser as recited in claim 1 with the addition of a hollow conical insert carried in said dispenser and having its base resting on said bottom wall, each leg being formed by three tabs struck respectively from said side and bottom walls and said insert to form openings therein, said tabs being bendably attached to their parent walls along coextensive lines adjacent the juncture of said side and bottom walls, said insert tab extending downwardly through said bottom opening, and said side wall tab extending downwardly through said insert and bottom openings, said three tabs lying together to form a reinforced leg.

5. The method of forming a poison bait dispenser from a sheet metal container having side and bottom walls comprising first cutting a plurality of tabs from said side wall in spaced relation about the circumference thereof to form outlet openings, then cutting a matching series of tabs in said bottom wall in registering relation with said side wall tabs, and then bending all of said tabs downwardly to project below said bottom wall, each matching pair of tabs from said side and bottom walls being pressed together to form a reinforced supporting leg for said dispenser.

References Cited in the file of this patent
UNITED STATES PATENTS

| | | |
|---|---|---|
| 558,135 | White | Apr. 14, 1896 |
| 1,917,132 | Labomarde | July 4, 1933 |